Nov. 7, 1967   R. O. ROWLANDS   3,351,896
UNDERWATER TARGET DETECTION SYSTEM
Filed June 4, 1965
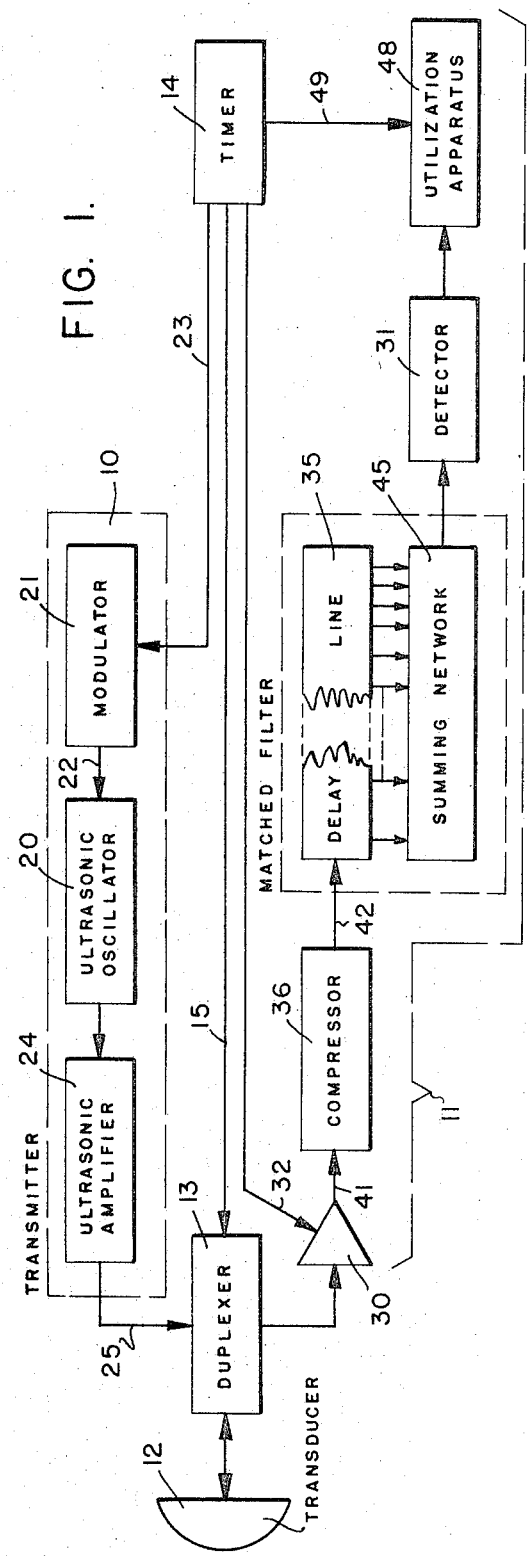
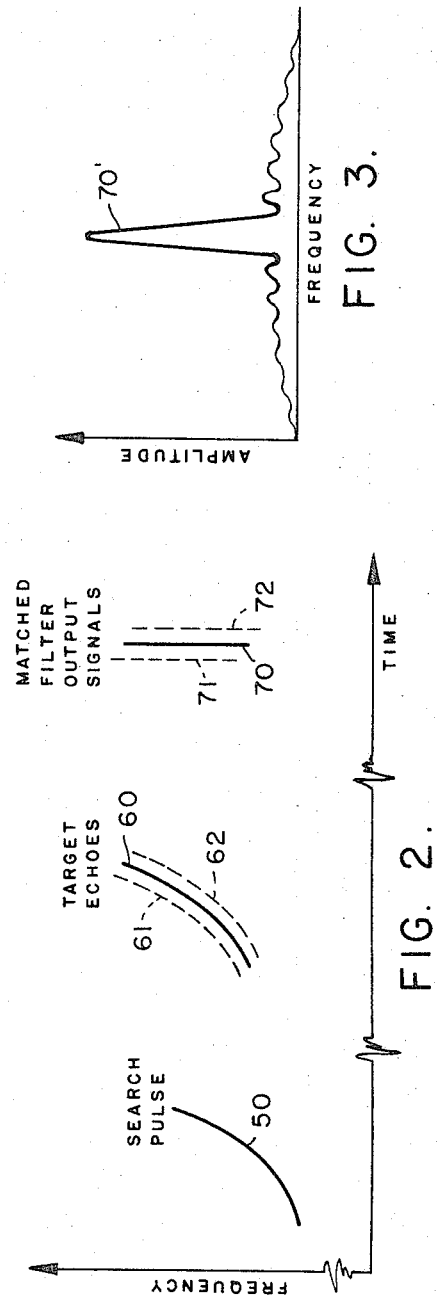
INVENTOR.
RICHARD O. ROWLANDS
BY V. C. MULLER
ATTORNEY.

United States Patent Office 3,351,896
Patented Nov. 7, 1967

3,351,896
UNDERWATER TARGET DETECTION SYSTEM
Richard O. Rowlands, State College, Pa., assignor, by mesne assignments, to the United States of America as represented by the Secretary of the Navy
Filed June 4, 1965, Ser. No. 461,567
1 Claim. (Cl. 340—3)

This invention relates to underwater target detection systems, and particularly to such systems of the type employing search pulses of frequency-modulated character.

In prior art underwater target detection systems employing frequency-modulated search pulses, the type of frequency modulation imposed upon the search pulses is that wherein the frequency increases during the pulse at a constant rate, between preselected lower and upper frequencies; in such systems, the frequency of a pulse echo returned from a target likewise increases linearly but, because of the well-known Doppler effect, the pulse echo frequency increases at a different rate, and between different lower and upper limits, dependent upon the extent of Doppler shift, in turn dependent upon target velocity relative to the watercraft carrying the target detection system. Optimum detectability of these pulse echoes exhibiting widely differing frequency characteristics as a result of different target conditions ordinarily requires employment, in the pulse echo receiving apparatus, of a number of matched filters, each such filter itself being comparatively complex and expensive.

It is an object of the present invention to provide an improved underwater target detection system which employs a particular type of non-linear form of search pulse frequency modulation such that Doppler-invariant detection of resultant echo pulses can be accomplished by use of a single matched filter.

It is another object of the invention to provide an improved underwater target detection system which employs a particular type of non-linear form of search pulse frequency modulation such that the combination of a non-dispersive delay line and a summing circuit serves as a matched filter for echo pulse detection under all Doppler conditions.

It is a further object of the present invention to provide an improved underwater target detection system which employs a particular type of non-linear form of search pulse frequency modulation such that, by use of a specially-tapped non-dispersive delay line and summing network in the receiver, Doppler-invariant pulse-compression type of detection is accomplished.

Other objects, advantages and novel features of the invention will become apparent from the following detailed description when considered in conjunction with the accompanying drawing wherein:

FIG. 1 illustrates in block diagram form an exemplary embodiment of the invention as employed in a sonar system;

FIG. 2 illustrates the hyperbolic type of search pulse and echo pulse frequency modulation, and the Doppler-invariant pulse-compression type of detection, characteristic of the present system; and FIG. 3 depicts generally, in a signal-amplitude versus frequency plot, the frequency spectrum of the time-compressed output pulse signal delivered by the matched filter of the present system.

In accordance with the present invention, the search pulses generated by the transmitter section of the improved underwater target detection system are so modulated that the frequency changes, between preselected limits, as a hyperbolic function of time during the pulse; in consequence of the particular form of frequency modulation employed, successive time intervals, each embracing a fixed number of cycles of the search pulse, have durations which vary in a geometric progression, a characteristic which likewise holds for the echo-pulse regardless of the extent of Doppler shift; in the receiver section, optimum detectability of all resultant echo pulses, regardless of the extent of Doppler shift, can be achieved by use of a single matched filter; in further accordance with the present invention, optimum detection is achieved by a passive sampling technique using a linear (non-dispersive) delay line which is provided with a number of taps spaced in geometric progression, and which is employed in association with a summing circuit. Use of this hyperbolic type of search pulse frequency modulation, and of a tapped linear delay line and summing circuit, enables significant simplification in comparison to conventional frequency-modulated pulse echo ranging apparatus.

Referring first to FIG. 1, illustrating in generalized and schematic block diagram form the organization of an exemplary embodiment of the invention as employed in an echo ranging sonar system which may be carried by say a submarine or other watercraft, it is to be understood that, apart from the particular form of frequency modulation impressed upon the search pulses and the geometric-progression tapping of the delay line, each of the individual block-respresented units may be of well known type employing conventional circuitry or apparatus. The exemplary sonar system, here shown in simplified form but sufficing to provide an understanding of the manner in which the invention may be employed, comprises a transmitter section 10, a receiver section 11, and a single transducer 12 which, by use of a duplexer 13, serves both for transmission of the search pulses and for reception of resultant signals during the listening periods between search pulse transmission instants. Duplexer 13 may be of a type including a relay (not shown) operated by timer 14 via lead 15 constituting a first timing signal. In transmitter 10, oscillator 20 in this instance is of voltage-controlled variable-frequency type which operates to generate an ultrasonic pulse varying in frequency in accordance with the varying magnitude of a modulating DC pulse applied to oscillator 20 by modulator 21 via lead 22. Modulator 21 is a shaped-pulse generator, triggered by timer 14 via lead 23 constituting a second timing signal, say at intervals of 1.5 seconds, and is designed to generate a voltage pulse of duration equal to that desired for the search pulse, say 100 ms. (milliseconds), and having a voltage amplitude versus time characteristic which controls oscillator 20 to generate an ultrasonic pulse varying in frequency as a hyperbolic function of time, later specified in algebraic form. Amplifier 24 raises the energy level of the frequency-modulated pulses generated by oscillator 20 and applies the resultant amplifier pulses to transducer 12 via lead 25 and duplexer 13.

Next considering receiver 11, multi-stage amplifier 30 may employ conventional techniques for reverberation attenuation and for so-called ODN (own-Doppler-nullification), and is further preferably of TVG (time-variable-gain) or similar type functioning to maintain the background noise-signal output of amplifier 30 at substantially constant level, enabling discrimination of target echoes by use of a threshold type of detector 31, which is designed or set to be responsive only to amplifier output signals of greater than preselected amplitude relative to reverberation or other background noise. As conventionally required in receivers employing the TVG technique, TVG circuit reset pulses are supplied to amplifier 30 by timer 14 via lead 32 constituting a third timing signal. Linear (nondispersive) delay line 35 may be of magnetic or any other suitable type, but in any event for optimum results must be designed to have the characteristic of being able to be "occupied" by or to "contain" a sufficient portion of a received target echo to substantially correspond to the search pulse length. While the delay time of line 35 may conceptually be specified in terms of the actual search pulse duration, physical realization of such a delay line to actually provide a delay as long as the duration of the frequency-modulated search pulse, in this instance say 100 ms., would be extremely difficult and such a line in any event would be of impractical size; to simplify and make practical the implementation of the system, therefore, a signal-duration compressor 36, sometimes termed a delay-line time compressor and conventional in the art concerning compressed-time correlators and matched filters for active sonars, is interposed between amplifier 30 and delay line 35, and may in this instance be designed to provide a time compression ratio of say 200/1, correspondingly raising the signal frequencies by the same ratio. By way of simplified example, compressor 36 may take the form of a recording and playback apparatus having a magnetic tape loop or magnetic drum on which is recorded at low speed the target-echo signal delivered via lead 41, and which plays back the recorded signal at the necessary higher speed, delivering the time-compressed signal to delay line 35 via lead 42. Delay line 35 is provided with a series of signal-sampling taps, spaced in geometric progression as here shown schematically, which taps feed into a summing network 45. The combination of tapped delay line and summing network takes advantage of the lack of correlation in noise as compared with the desired signal to provide a random summation of noise and linear summation of the signal, thereby improving the over-all signal-to-noise ratio beyond the theoretical figure available without integration. The summing network causes the components of the desired pulse-echo signal to add at the output and the noise to tend to cancel. In accordance with the sampling theorem (for example as discussed in the article "Communication in the Presence of Noise," Proc. I.R.E., vol 37, January 1949, pp. 10–21), the number of taps to be provided for optimizing detectability of the desired signal in a noise background should be made equal to 2WT, where W and T are the bandwidth and the delay time, respectively, of delay line 35. Completing the exemplary embodiment of the invention, utilization apparatus 48 may be simply an oscilloscope type of indicator, its sweep period and start instant being properly set and synchronized to the duration and initiation instant of the listening period by means of timing pulses delivered via lead 49 by timer 14 constituting a fourth timing signal.

Referring now to FIG. 2 which depicts the particular type of search pulse and echo pulse frequency variation and the Doppler-invariant pulse-compression type of detection which are characteristic of the described system, curve 50 corresponds to the frequency-modulated search pulse (projected from the moving watercraft carrying the described sonar apparatus), curve 60 corresponds to an echo pulse reflected from a target which is stationary, and the resultant output pulse from the matched filter is represented at 70. Curve 61 corresponds to an echo-pulse reflected from a target having a velocity component directed toward the watercraft, curve 62 corresponds to an echo pulse reflected from a target having a velocity component directed away from the watercraft, and the resultant output pulses derived from echo pulses 61 and 62 are represented at 71 and 72, respectively. It may be noted at this point that echo pulse frequency-characteristic curves 61 and 62 in the FIG. 2 plot can be shifted laterally along the time dimension to positions wherein they coincide with echo pulse frequency-characteristic curve 60 (except as to overlapping end portions), a capability resulting from the hyperbolic type of frequency modulation imposed upon the search pulse, making it possible for a suitably tapped delay line in combination with a summing network to serve as a matched filter for all target-echoes regardless of Doppler shift. Further, since the matched filter operates to provide a pulse-compression effect relative to the echo pulse 60 stemming from a stationary target, yielding a matched filter output signal which is represented in the frequency versus time domain at 70 in FIG. 2, also represented in the signal amplitude versus frequency domain at 70' in FIG. 3, it will be evident in view of the foregoing that the single matched filter also operates to convert any Doppler-shifted echo pulse to a pulse-compressed output signal. The disclosed system is thus Doppler-invariant as to echo-detection capabilities.

The geometric progression relationship of successive time intervals embracing a fixed number of cycles of the echo pulse signal (such relationship resulting from hyperbolic type of frequency modulation of the search pulse), and consequently the validity of the disclosed system, can be demonstrated by brief mathematical analysis, as follows:

The frequency $f$ at any instant $t$ during the pulse is given by the equation $$f = f_0/(1 - Kt) \qquad (1)$$

wherein $f_0$ is the initial frequency and K is any preselected constant. The effect of Doppler on the properties of a signal in the $(f, t)$ domain is multiplication of the $f$ and $t$ coordinates by reciprocal constants here designated as $1/p$ and $p$, respectively. The Doppler shifted version of this signal is, therefore, $$f/p = f_0/(1 - Kpt) \qquad (2)$$

Multiplying both sides of Equation 2 by $p$ and solving for $df/dt$ yields $$df/dt = f^2 K/f_0 \qquad (3)$$

Since the single Equation 3 is applicable to all resultant target echo curves, and the slope $df/dt$ which is a function of the variable $f$ is entirely independent of $p$ and $t$, the target echo curves can in fact be made to coincide (except for overlapping end portions) by lateral shift along the time dimension as has been noted earlier, the significance of this being that a target echo applied to delay 35 (FIG. 1) will at some instant be so contained therein as to result in compressed pulse detection as has been outlined.

The phase $\psi$ of the signal is given by the equation $$\psi = \int 2\pi f \, dt$$
$$= (2\pi f_0/K) \log 1/(1 - Kt) \qquad (4)$$

The instantaneous amplitude A of the signal at any instant $t$ is therefore given by the equation $$A = \overline{A} \cos [(2\pi f_0/K) \log 1/(1 - Kt)] \qquad (5)$$

wherein $\overline{A}$ represents maximum amplitude. The number of cycles occurring in time $t$ is given by $$\frac{f_0}{K} \log 1/[1 - Kt] \qquad (6)$$

The number of cycles occurring in a time $(t + t_m)$ is given by $$\frac{f_0}{K} \log 1/[1 - K(t + t_m)] \qquad (7)$$

The number of cycles $m$, occurring in time $t_m$ is therefore given by expression (7) minus expression (6):

$$m = \frac{f_0}{K} [\log 1/(1 - Kt - Kt_m) - \log 1/(1 - Kt)] \qquad (8)$$

Equation 8 can be expressed equivalently in exponential form as $$1 - Kt - Kt_m = (1 - Kt) e^{mK/f_0} \qquad (9)$$

wherein $e$ is the base of the natural logarithm of Equation 8 and is approximately equal to 2.7183.

Solving Equation 9 for the interval $t_m$ encompassing $m$ cycles, $$t_m = (1 - Kt)(1 - e^{-mK/f_0}/K \qquad (10)$$

The duration of the succeeding interval $t_m'$ encompassing $m$ cycles can be obtained by changing, in Equation 10, $t_m$ to $t_m'$ and $t$ to $(t + t_m)$, yielding $$t_m' = (1 - Kt - Kt_m)(1 - e^{-mK/f_0}) \qquad (11)$$

Taking the ratio of Equation 11 to Equation 10, $$\frac{t_m'}{t_m} = \frac{1 - Kt - Kt_m}{1 - Kt} \quad (12)$$

Substituting in (12) from (9)

$$\frac{t_m'}{t_m} = e^{-mK/f0} \quad (13)$$

Hence the ratio of successive time intervals embracing a fixed number of cycles of the echo pulse signal is a constant, in this instance (i.e. for the case wherein the frequency increases, rather than decreases, during the pulse) having a magnitude smaller than 1, the significance of this being that a delay line having taps spaced therealong in a geometric progression with a multiplying factor equal to $e^{-mK/f0}$ will operate in conjunction with a summing circuit, as described, to effect detection of the resultant frequency-modulated target-echo pulses.

Having described an exemplary embodiment of the invention and further having disclosed the basic principles thereof, obviously many modifications, variations and applications resulting in other embodiments are possible in the light of the above teachings. It is therefore to be understood that, within the scope of the appended claim, the invention may be practiced otherwise than as specifically described herein.

What is claimed is:

An underwater echo-ranging target-detection system comprising:

timer means for providing first, second, third, and fourth timing signals;

modulator means connected to said timer means for receiving said second timing signal and for providing a series of D.C. pulses each having a voltage which varies as a predetermined function of time;

voltage controlled, variable-frequency oscillator means connected to said modulator means for receiving said D.C. pulses and providing a series of search pulses each having a frequency $f$ which varies as a function of time $t$ in accordance with the equation $$f = f_0/(1 - Kt)$$

wherein $f_0$ is a predetermined initial frequency and K is a predetermined constant;

amplifier means connected to said oscillator means for receiving and amplifying said search pulses;

transducer means for transmitting said search pulses, receiving the echoes thereof and providing echo signals;

duplexer means having an output and connected to said timer means for receiving said first timing signal and connected to said amplifier means for receiving said amplified search pulses and connected to said transducer means for providing thereto each of said search pulses for transmission by said transducer means and for receiving said echo signals of said transducer means, said duplexer means providing said echo signals at said output;

a time-variable-gain amplifier connected to the output of said duplexer means and to said timer means for receiving respectively therefrom echo signals and said third timing signal for providing amplified echo signals and adapted to maintain background noise-signal output thereof at a substantially constant level;

compressor means connected to said time-variable-gain amplifier for receiving said amplified echo signals, for raising the signal frequencies by a time compression ratio and for providing time compressed signals;

a non-dispersive delay line connected to said compressor means for receiving and delaying said time compressed signals;

a plurality of signal-sampling taps spaced along said delay line in a geometric progression having a predetermined multiplying factor equal to $$e^{-mK/f0}$$

wherein $e$ is the base of natural logarithims, $m$ is the number of cycles occurring in a predetermined time interval, K is said constant and $f_0$ is said initial frequency;

summing network means connected to said signal-sampling taps for providing an output signal having an instantaneous amplitude equivalent to the summation of the signal amplitudes provided by said taps;

threshold detector means connected to said summing network for receiving said signal and providing a detector output signal when the amplitude of said summing network signal is greater than a predetermined amplitude; and utilization apparatus connected to said detector means for receiving said signals therefrom and connected to said timer means for receiving said fourth timing signal for utilizing said detector output signals in response thereto;

whereby successive time intervals embracing successive groups of a fixed number of cycles of any resultant echo signal present the characteristic of varying in a geometric progression having a predetermined ratio factor equivalent to said predetermined multiplying factor, and said delay line and summing network operate to affect Doppler-invariant detection in consequence of said geometric progression characteristic.

References Cited

UNITED STATES PATENTS 3,216,013   11/1965   Thor _____ 343—17.2

OTHER REFERENCES

Rowlands, "F.M. Signals Tailored to Specific Sonar and Radar Requirements," Wescon 63, No. 7.4, August 1963, pp. 1–5 relied on.

RODNEY D. BENNETT, *Primary Examiner.*

RICHARD A. FARLEY, *Examiner.*